United States Patent [19]

Ziaylek, Jr.

[11] 4,143,579
[45] Mar. 13, 1979

[54] METAL INSERT

[75] Inventor: Theodore Ziaylek, Jr., Yardley, Pa.

[73] Assignee: Yardley Products Corporation, Yardley, Pa.

[21] Appl. No.: 850,575

[22] Filed: Nov. 11, 1977

Related U.S. Application Data

[63] Continuation-in-part of Ser. No. 729,579, Oct. 4, 1976, abandoned, which is a continuation-in-part of Ser. No. 595,472, Jul. 14, 1975, abandoned.

[51] Int. Cl.² ............................................. F16B 13/06
[52] U.S. Cl. .......................................... 85/72; 85/73; 85/83; 151/41.73; 151/41.74
[58] Field of Search ....................................... 89/72–79, 89/68, 83; 151/41.73, 41.74

[56] References Cited
U.S. PATENT DOCUMENTS

| | | | |
|---|---|---|---|
| 1,168,770 | 1/1916 | Wagner | 85/83 |
| 1,808,318 | 6/1931 | Pleister | 85/72 |
| 2,140,919 | 12/1938 | Mushet | 85/68 |
| 2,252,316 | 8/1941 | Gelpcke | 85/74 |
| 2,313,522 | 3/1943 | Dinnes | 85/74 |
| 3,007,364 | 11/1961 | Dickie | 85/74 |
| 3,022,701 | 2/1962 | Potruch | 85/83 |
| 3,110,212 | 11/1963 | Wing et al. | 85/74 |
| 3,198,231 | 8/1965 | Bisbing | 151/41.73 |
| 3,216,304 | 11/1965 | James et al. | 85/72 |
| 3,411,398 | 11/1968 | Blakeley et al. | 85/72 |
| 3,477,335 | 11/1969 | Gold et al. | 85/72 X |
| 3,566,739 | 3/1971 | Lebar | 85/72 |
| 3,727,254 | 4/1973 | Tildesley | 151/41.73 X |
| 3,921,496 | 11/1975 | Helderman | 85/83 |

FOREIGN PATENT DOCUMENTS

| | | | |
|---|---|---|---|
| 69533 | 8/1945 | Norway | 85/73 |
| 640451 | 7/1950 | United Kingdom | 85/83 |

*Primary Examiner*—Rodney H. Bonck
*Attorney, Agent, or Firm*—Albert Sperry; Frederick A. Zoda; John J. Kane

[57] ABSTRACT

One piece metal insert adapted to be embedded in a cavity in a work piece embodies a sleeve portion and a nut portion joined together by a frangible connection. The sleeve portion has an internal diameter which is less than a zone of maximum diameter on the nut portion and is adapted to be moved into a telescoping position about the nut portion so as to be expanded by the nut portion and forced into firm engagement with the side walls of the cavity in the work piece. The sleeve portion has splines on the exterior thereof which are inclined with respect to the longitudinal axis of the insert so that when they are embedded in the side walls of the cavity they will establish a positive connection with the work piece and resist axial movement of the sleeve portion with respect to the work piece. The nut portion of the insert has ribs on the exterior thereof in a zone of maximum diameter so that when the sleeve portion of the insert is forced into a position wherein it surrounds the nut portion the ribs will cut into the inner surface of the sleeve portion and establish a positive connection therewith.

3 Claims, 4 Drawing Figures

METAL INSERT

This application is a continuation-in-part of co-pending application Ser. No. 729,579 filed Oct. 4, 1976 which is a continuation-in-part of application Ser. No. 595,472 filed July 14, 1975, both now abandoned.

BACKGROUND OF THE INVENTION

It is frequently necessary to embed metal inserts in work pieces formed of metal, plastic or other material in order to mount threaded or other elements thereon. For this purpose it has been suggested that the metal insert be formed with a sleeve portion and a nut portion arranged so that the nut portion may be drawn into the sleeve portion so as to expand the sleeve portion and force it outward into engagement with the side walls of the opening or cavity in which the insert is positioned. Typical devices of this type are disclosed in U.S. Pat. Nos. 1,808,318; 3,216,304; 3,411,398; 3,493,254 and 3,566,739. However such constructions require the opening in which the insert is to be embedded to pass all the way through the work piece or to be of greater depth than the insert. As a result, the base of the nut portion of the insert is unsupported and is only held in place by frictional engagement of the nut portion with the sleeve portion. Accordingly the nut portion is capable of end play and may be separated from the sleeve portion of the insert in the event a bolt or the like threaded into the nut portion is subjected to axial forces such as a blow tending to separate the nut portion from the sleeve portion. It is further found that radial expansion of the sleeve portion of the insert tends to rupture the sleeve so as to weaken the sleeve and the retention thereof by the nut portion and by the work piece.

In accordance with the present invention the insert embodies a sleeve portion and a nut portion initially joined by a frangible connection permitting the sleeve portion to be forced downward about the nut portion into telescopic relation therewith while the nut portion remains in engagement with the bottom of the cavity in which the insert is positioned. The sleeve portion of the insert is provided with inclined splines on the exterior thereof adapted to dig into the side walls of the cavity causing it to rotate as it is forced downward into the work piece and over the nut portion of the insert. In this way the sleeve portion is caused to spin or rotate and is subjected to metal working or swaging action as it enters the cavity in the work piece threading its way into position while being expanded by the nut portion of the insert. At the same time the nut portion is forced against the bottom of the cavity so as to be held against rotation as the sleeve is rotated with respect thereto.

Such working of the metal of the sleeve is found to markedly reduce the tendency of the sleeve to rupture as it is expanded by the nut portion. As a result the sleeve portion is positively connected to the work piece in a manner which effectively resists axial movement of the sleeve portion with respect to the work piece. In a similar way the nut portion of the insert also is provided with outwardly projecting ribs which dig into the inner surface of the sleeve portion as it moves into telescoping relation therewith. In this way the working and rotational movement of the sleeve is aided during insertion thereof into the work piece whereas relative movement of the nut portion and sleeve portion after insertion is prevented and a positive connection between these two elements is established. As a further feature of the present invention the nut portion of the assembly is provided with a zone of reduced diameter near the end thereof so that after the sleeve portion has moved downward past the zone of maximum diameter of the nut portion the expanded sleeve portion will contract inward so as to embrace the nut portion effectively and lock the nut portion and sleeve portion together as a unit further preventing axial separation or displacement thereof with respect to each other.

DESCRIPTION OF THE PREFERRED EMBODIMENT

Figure 1:
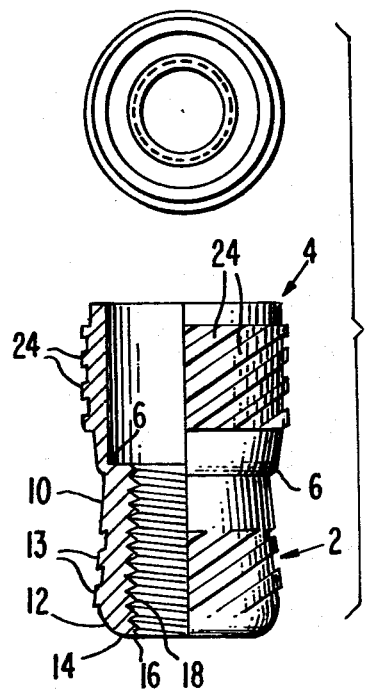
FIG. 1 is a side elevation of a typical insert embodying the present invention with a portion thereof cut away.

In that form of the invention chosen for purposes of illustration in the drawing the insert is formed of metal such as brass or the like and has a nut portion 2 and a sleeve portion 4 joined together by a frangible connection 6. The nut portion of the insert may be provided with internal threads 8 if desired but when the insert is to function only as a bearing or holder for a rod or the like the nut portion may have a cylindrical or other internal configuration.

Figure 4:
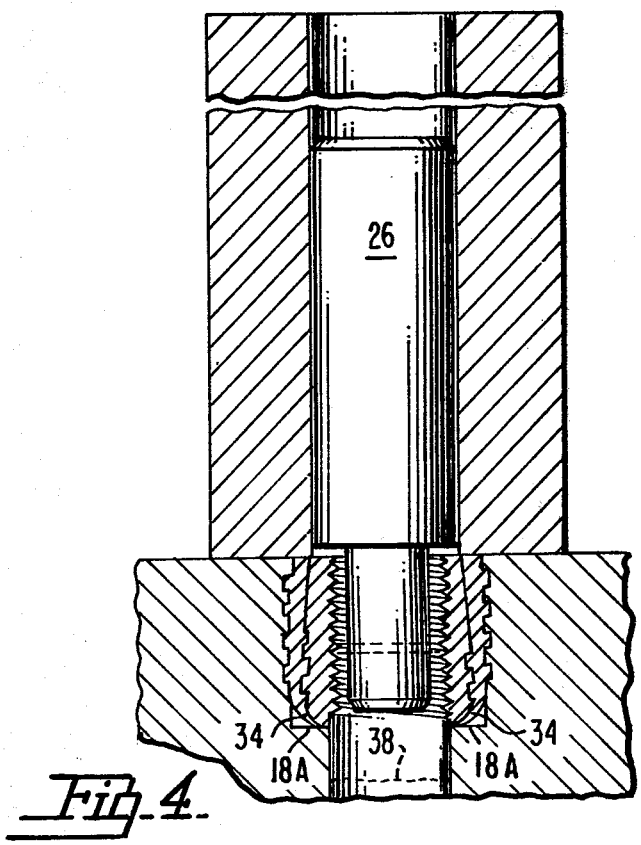
FIG. 4 illustrates the insert of FIG. 1 in its fully embedded position.

The outer surface of the nut portion 2 is inclined outward so as to be tapered from a zone of small diameter at 10 adjacent the frangible connection 6 to a zone of maximum diameter 12 spaced from the lower end of the nut portion. The lower end of the nut portion preferably presents a zone of reduced diameter at 14 terminating in a flat end surface 16 adapted to seat against the bottom 18 of a hole or cavity 20 in a work piece 22 which has approximately the same internal diameter as the sleeve portion 4 of the insert. The zone 12 of maximum diameter of the nut portion is provided with ribs 13 which project outwardly so as to cut into the inner surface of the sleeve portion 4 as the sleeve portion is forced into telescoping relation with the nut portion as shown in FIG. 4. The ribs 13 are inclined at an angle of about 30 degrees with respect to the longitudinal axis of the insert and serve to establish a positive connection with the sleeve portion resisting relative axial movement of the elements of the insert after insertion in the work.

The sleeve portion 4 of the insert is preferably generally cylindrical in shape and has an internal diameter which is slightly larger than the external diameter of the nut portion of the insert at the zone of small diameter 10 but less than that of the zone of maximum diameter of the nut portion at 12 wherein the ribs 13 are located.

The outer surface of the sleeve portion of the insert is provided with projections or splines 24 which are inclined in the same direction as any threads 8 located on the inner surface of the nut portion of the insert. The splines 24 are also inclined at an angle of about 30° with respect to the axis of the insert and at approximately the same angle and in the same direction as the ribs 13 on the nut portion 2.

Figure 2:
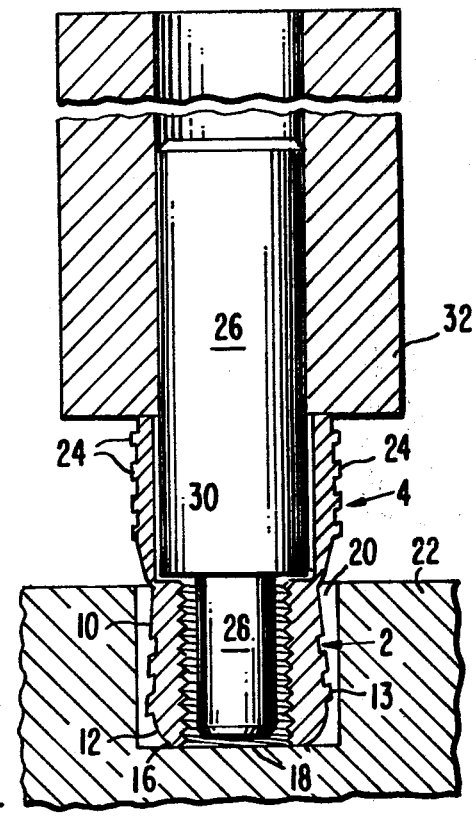
FIG. 2 is a vertical sectional view of the insert of FIG. 1 together with a tool for applying the insert.
Figure 3:
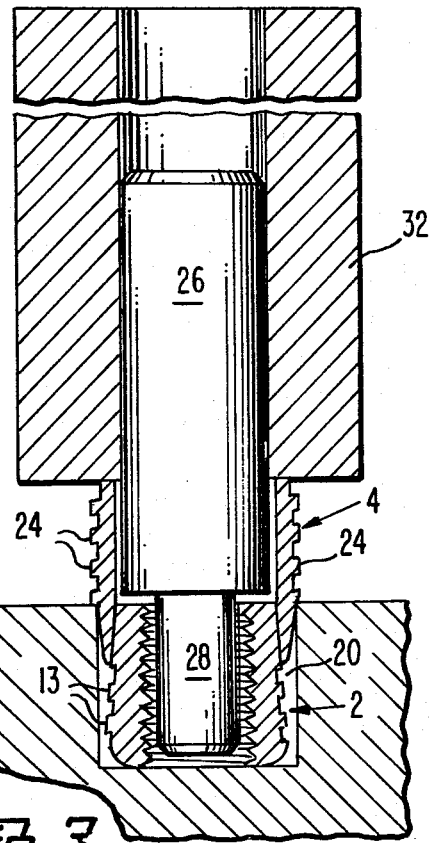
FIG. 3 is a view similar to FIG. 2 showing the insert partially inserted.

In using the insert of the present invention and as shown in FIG. 2, the nut portion 2 of the insert is placed in the cavity of the work piece 22 so that the end 16 of the nut portion engages the bottom 18 of the cavity. A tool 26 in the form of a pilot has an end 28 shaped to enter the central bore of the nut portion of the insert and a larger part 30 adapted to fit within the sleeve portion of the insert. A cylindrical ram or hammer member 32 surrounds the pilot tool 26 and is movable toward the work piece 22 to force the sleeve 4 downward into the cavity 20 and about the small zone 10 of the nut portion of the insert. The sleeve is thus caused to break the frangible connection 6 and move to the position shown in FIG. 3.

Continued movement of the sleeve portion 4 into the cavity 20 causes it to be expanded by the nut portion of the insert as it passes down over the zone 12 of maximum diameter of the nut portion as shown in FIG. 4. The sleeve portion is thus forcibly thrust outward into frictional contact with the inner side walls of the cavity 20 while the nut portion of the insert is forcibly seated against the bottom 18 of the cavity. At the same time the splines 24 on the outer surface of the sleeve are caused to bite into the side walls of the cavity so as to establish a positive connection between the sleeve portion and the work piece. Moreover, the pitch or angular relation of the splines 24 with respect to the longitudinal axis of the insert is greater than the angle of repose. Herein the angle of repose is defined as the minimum angle for the splines 24 at which the insert will thread into the base material cleanly rather than tearing the base material or shearing off the splines. It should be appreciated that this angle will be different for different base materials. Accordingly as the sleeve is forced downward into the cavity and over the nut portion of the insert, the sleeve portion is caused to rotate or spin and the metal of which the sleeve is formed is subjected to swaging or working as the sleeve is expanded. During such movement of the sleeve the nut portion of the insert is forced against the bottom of the cavity so as to be held against rotation while the ribs 13 on the nut bite into the inner walls of the sleeve and aid in causing the sleeve to be rotated.

The twisting and rotation of the sleeve as it is forced downward and expanded not only cause the splines 24 to be screwed into the material in the walls of the cavity with a minimum of distortion of the material but also causes the metal of the insert to be subjected to swaging or metal working action which materially reduces the tendency of the sleeve to rupture as it is expanded radially.

The splines of the sleeve portion 4 of the insert of course hold the insert against axial displacement so that it is securely fixed within the cavity 20 of the work piece. Further, as the inner end of the expanded sleeve portion moves beyond the zone 12 of maximum diameter to the zone 14 of reduced diameter of the nut portion the inner end of the sleeve contracts and flows inward adjacent the end surface 16 of the nut portion as shown at 34. In this way the sleeve portion is caused to embrace and grip the nut portion so as to positively lock the two elements of the insert together.

While the splines 24 on the sleeve portion 4 and the ribs 13 on the nut portion 2 may have various configurations they are preferably inclined at an angle of about 30° so as to permit them to cut into the work piece and sleeve as in the form of threads without stripping off or mutilating the material they engage. Furthermore, when they are inclined to the right on an insert having a right hand thread on the interior of the nut portion, the forcible rotation of a bolt engaging such threads will urge the sleeve and nut portion of the insert against the bottom 18 of the cavity 20 to increase its retention by the work piece. Moreover such retention of the insert further reduces any tendency for end play to develop between the insert and work piece. Of course the same advantage is attained when the splines 24 and ribs 13 are inclined to the left if the nut portion has a left hand thread.

Since the sleeve portion 4 of the insert, when forced downward over the inclined surface 10 of the nut portion 2 of the insert exerts an inwardly directed force on the nut portion, it is necessary to avoid such compression of the nut portion as to distort the same or displace the threads thereof. Therefore it is desirable to form the sleeve portion 4 of the insert with a wall thickness which is less than that of the nut portion of the insert and preferably no more than about one half the thickness of the walls of the nut portion 4 at the end 10 thereof adjacent the frangible connection 6.

Further as shown in FIG. 4 the bottom 18A of the hole or cavity 20 against which the nut portion 4 of the insert is seated, may be in the form of a shoulder surrounding a passage 36 through which a bolt or threaded element may extend. It is then possible to pass a bolt or other element into the nut portion of the insert from either side of the work piece as shown in dotted lines at 38.

The inserts of the present invention may of course, be formed of various sizes as required and may be made of any preferred metal or alloy desired. In general the axial length of the sleeve portion is approximately equal to the length of the nut portion of the insert so that when fully embedded in the work piece as shown in FIG. 4, the upper or exposed ends of both portions of the insert will be flush with the upper surface of the work piece. However, this is not essential to the invention since the insert may in some instances have a portion thereof projecting above the surface of the work piece or located in a counter-sunk recess if desired.

In view thereof it should be understood that the particular embodiment of the invention shown in the drawings and described above is intended to be illustrative only.

I claim:

1. A one piece metal insert adapted to be embedded in a cylindrical cavity of predetermined diameter in a work piece, said insert comprising a substantially cylindrical nut portion and a substantially cylindrical sleeve portion joined by a frangible connection, said sleeve portion having an external diameter approximately equal to said predetermined diameter of the cavity in the work piece and having an internal diameter which is less than that of a zone of maximum diameter of said nut portion of the insert, said nut portion having axially inclined ribs being inclined in one direction on the exterior thereof in said zone of maximum diameter adapted to cut into the sleeve portion and establish a positive connection with the sleeve portion when the nut portion is forced against the bottom of the cavity and the sleeve portion is forced into the cavity and about said nut portion, said sleeve portion having axially inclined splines on the exterior thereof adapted to cause the sleeve portion to be threaded into the material on the side walls of said cavity as it is forced into the cavity, said axially inclined splines being axially inclined in the same direction as said axially inclined ribs and at approximately the same angle, said ribs and splines cooperating by being inclined in the same direction to cause said sleeve portion to be rotated and subjected to metal working action when it is forced into the cavity and expanded radially by said nut portion of the insert in order to prevent fracture of said sleeve portion during expansion thereof.

2. A metal insert as defined in claim 1 wherein said splines are inclined at an angle of approximately 30° with respect to the longitudinal axis of the insert.

3. A metal insert as defined in claim 1 wherein said nut portion has a zone of reduced diameter near the inner end thereof into which the end of the sleeve portion can contract to lock the sleeve portion and nut portion together.

* * * * *